United States Patent [19]

Schnell

[11] 4,023,735
[45] May 17, 1977

[54] APPARATUS AND METHOD FOR PROCESSING MEAT AND BONE PIECES

[76] Inventor: Karl Schnell, Muhlstr. 28, D-7065 Winterbach, Germany

[22] Filed: Mar. 8, 1976

[21] Appl. No.: 664,480

[30] Foreign Application Priority Data

Mar. 22, 1975 Germany ............................ 2512742

[52] U.S. Cl. .................................. 241/22; 241/23; 241/29
[51] Int. Cl.² ........................................ B02C 23/10
[58] Field of Search .................. 241/17, 21, 22, 23, 241/29

[56] References Cited

UNITED STATES PATENTS

| | | | |
|---|---|---|---|
| 1,129,868 | 3/1915 | Hoy | 241/23 X |
| 1,517,445 | 12/1924 | MacLachlan et al. | 241/17 X |
| 1,979,124 | 10/1934 | Tival | 241/23 X |
| 2,622,027 | 12/1952 | Torr | 241/29 X |

*Primary Examiner*—Granville Y. Custer, Jr.

*Attorney, Agent, or Firm*—McGlew and Tuttle

[57] ABSTRACT

Both large and small meat pieces and small meat pieces are processed by treating the pieces having relatively large bones to a coarse crushing operation to crush the bones and the meat to smaller sizes and discharging these smaller sizes into a preliminary fine crusher along with small meat pieces and smaller boned meat pieces of from 5 to 10 mm in size. Meat which is treated in the preliminary fine crusher is reduced to bone and meat sizes of from 0.5 to 1 mm. In addition, salt and ice is supplied to the preliminary fine crusher in order to dissipate part of the heat, preserve the meat and to add seasoning thereto. The sizes which are reduced are then directed with the salt, ice and water to a final fine crusher, where the products are reduced to an emulsified paste. The paste is then transmitted to a decanter in which the bone and fiber parts are separated from the meat, water and salt emulsion. The meat, water and salt emulsion may be fed directly to a machine for making sausages, for example.

1 Claim, 2 Drawing Figures

APPARATUS AND METHOD FOR PROCESSING MEAT AND BONE PIECES

FIELD AND BACKGROUND OF THE INVENTION

This invention relates in general to the treatment of meats and, in particular, to a new and useful method and apparatus for processing meats having large and small bone parts.

DESCRIPTION OF THE PRIOR ART

While cutting slaughter animals to pieces, it cannot be prevented, in spite of the use of up-to-date methods and tools, that parts of the meat, fatty tissues and similar substances remain on the removed bones, particularly on vertebral bones. These bones, as a rule, are not utilized in the production of meats and the nutritional value of these bones is thus lost to man. This also applies to various bone components, in particular, the inner parts of the bones. It is obvious that from the aspect of nutritional economy, this is a very distinct disadvantage.

SUMMARY OF THE INVENTION

The present invention is directed to a method and device for processing meat pieces which include the bones of both large and small sizes. The invention thus makes it possible to increase the yield of nutritive matter of slaughtered animals. In accordance with the invention, an apparatus for processing meat bones is provided with a coarse crusher for crushing large and small bones and meat pieces and this is arranged to discharge into a preliminary fine crusher which also receives other meat pieces and reduces them in sizes of from 0.5 to 1 mm. During this preliminary fine crushing, salt and ice water is advantageously added in order to cool the particles and to season and preserve the meats. By the repeated crushing of the meat bones, remaining parts of muscle, fat and other albuminous tissues, all of these parts become finally reduced and cut away from each other so that they may be separately fed, in the form of a paste, to a decanter. This is also true of the parts of the bones and the substances on the interior of the bones.

An advantage of the inventive apparatus and method is seen in the fact that it is no longer necessary to pay greater attention to a neat removal of the bones so that precious working time is saved in the process of cutting the meat animals into pieces and without having to put up with losses in the yield. In addition, the obtaining the tissue remnants in a raw state, makes it unnecessary to have a preliminary cooking. In fact, the inventive apparatus and method makes it possible to avoid any undesirable heating of the meat and the like by appropriately cooling the meat during the crushing with ice.

In a preferred arrangement, the crushing unit comprises a preliminary crusher which is followed by a fine crusher. The preliminary crusher supplies the fine crusher directly or the two crushers are separately connected to other delivery lines for use of the sized meat which is produced by them in various applications. The preliminary crusher advantageously includes at least two cutting sets mounted in sequence, each including a perforated plate and at least one cutting blade. By each cutting set, the material is further crushed. For this reason, the perforation diameter through which the meat pieces are passed diminish from plate to plate in the direction of the conveyance of the meat.

According to a further feature of the invention, the fine crusher is equipped with a so-called colloid head which comprises a wing rotating in a housing. Preferably, the meat or bone pieces leaving the housing are of a size from 0.5 to 1 mm and, at the outlet of the fine crusher, a very fine and highly emulsified paste is obtained. The decanter which is employed with the invention is provided with a pusher centrifuge in which the bone and meat particles of the emulsion are separated. The meat particles may then be used for the production of sausage, for example.

According to a further feature of the invention, the outlet of the fine crusher is associated with the inlet of a feed pump having its pressure side connected to the decanter. This means that the pump pushes the material supplied into the decanter and is provided with a suitable means for delivering the emulsion.

In another embodiment of the invention, the inlet of the crushing unit is associated with the discharge end of an ice supply device or of a cold water supply pipe. In such a case, the coarsely crushed material passes through the crushing unit along with the water and/or ice. The ice prevents an undesireable heating during the crushing process. The emulsion becomes the more diluted, the more water or ice is added. In addition, salt or spices may be added to the preliminary fine crushing unit. In the decanter, the bones are separated from the meat-water-salt emulsion.

Accordingly, it is an object of the invention to provide an improved method of treating both large and small bones and the associated meats and meat pieces, which comprises feeding the pieces into an inlet of a large crusher to effect crushing of the bones and the meat pieces to smaller sizes, for example, of from 5 to 10 mm, and directing the discharge from this coarse crusher into a preliminary fine crusher along with other meat and bone pieces which are already of a smaller size and effecting the crushing of these, preferably, with the addition of cooling water or ice and salt and, thereafter, delivering the preliminarily fine crushed meat and bones to a final fine crusher to form an emulsified paste, and thereafter, feeding the paste to a decanter in which the bone and fiber portions are separated from the meat, water and salt emulsion.

A further object of the invention is to provide a device which includes a coarse crusher for crushing large bone and meat pieces into smaller pieces of from 5 to 10 mm which is connected so that it may feed into a preliminary fine crusher for crushing the particles down to a size of from 0.5 to 1 mm, and which has a discharge which is advantageously connected to a final fine crusher which forms the materials into a emulsified paste and which also includes means for pumping the paste into a decanter for separating some of the bones and fiber parts from the remaining meat paste.

A further object of the invention is to provide a device for treating meats, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENT

Figure 1:
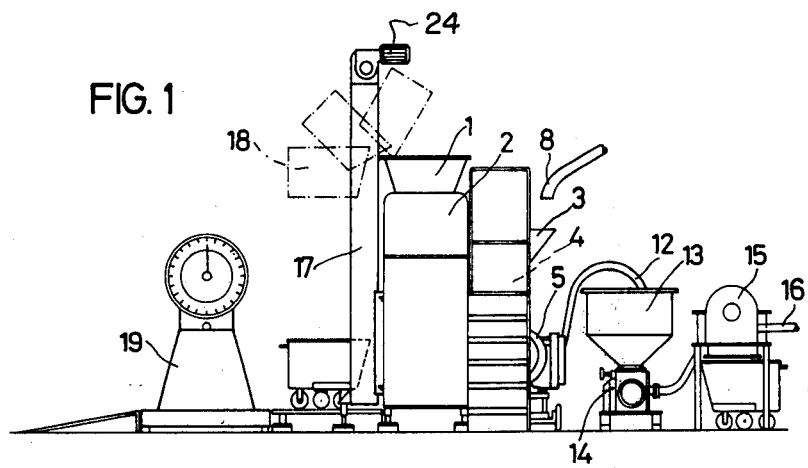
FIG. 1 is a somewhat schematic side elevational view of a device for treating meats constructed in accordance with the invention.
Figure 2:
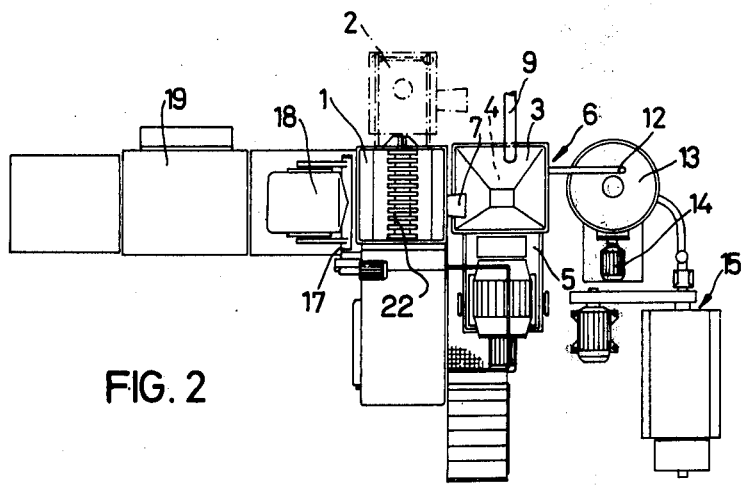
FIG. 2 is a top plan view of the device shown in FIG. 1.

Referring to the drawing in particular, the invention embodied therein, comprises a device for treating bone meats, which have both large and small bone pieces, and which includes, in the embodiment illustrated, a wheeled cart or container 18 into which the meat pieces are placed and first weighted on a platform scale 19. Carts 18 are then moved into association with a lift mechanism 17 which lifts cart 18 upwardly as indicated in the dotted line positions at the top of FIG. 1 so that it becomes tilted and dumps the material into a hopper 1 of a coarse crusher, generally designated 2. Coarse crusher 2, which may be withdrawn to a position indicated in dotted lines in FIG. 2, for the purposes of cleaning and access, has means therein for breaking the bones as well as for crushing the meats into smaller sizes, preferably in a size range of from 5 to 10 mm. Coarse crusher 2 includes a rotating crusher part 22, which is driven by a motor (not shown). Lifting device 17 advantageously includes a motor 24 driving the lift mechanism and the entire device 17 may also advantageously be of a type which may be moved about.

The coarse crusher 2 has a discharge 7 which is advantageously connectable to a hopper 3 of a preliminary fine crusher 4. Preliminary fine crusher 4 forms a crushing unit 6, together with a final fine crusher 5. The material delivered from the coarse crusher 2, together with additional pieces of meat which are already of a size in the range of from 5 to 10 mm are crushed in the prelimenary fine crusher 4 down to dimensions of from 0.5 to 1 mm of both bones and meat pieces.

Preliminary crusher 4 is an upright device of a perforated-plate type. The crusher comprises at least two cutting sets (not shown) which are mounted in sequence in the conveying direction and which include a perforated plate through which the material must be passed which is sized in smaller sizes in the direction of flow of the material so that the final crushed material is the smallest.

In accordance with a further aspect of the method of the invention, ice is advantageously supplied through a conduit 8 into hopper 3 of the prelimenary fine crusher 4. In addition, a conduit 9 is provided for delivering salt which may be salt alone or salt including spices and similar condiments to enhance the flavor of the meat and to ensure its preservation during treatment. The salt does not, therefore, serve only as a seasoning or spice, but also contributes to the preservation of the crushed material. The ice which is added has a similar purpose in preventing the deterioration of the formation of germs in the material and it also functions to absorb the heat produced by the action of the crushers.

Prelimenary crusher 4 is provided with an outlet which is connected directly into the inlet of the final fine crusher 5. Final fine crusher 5 is supplied with a mixture of meat and bones which have the dimensions of approximately from 0.5 to 1 mm, and which includes crushed ice, as well as ice water, salt and spices, if added. Final fine crusher 5 is equipped with a colloid head (not shown) which acts on the meat and bones to form them into a highly emulsified paste. The paste is discharged through a discharge pipe 12 to a filling funnel 13 of a feed pump 14 which is connected to deliver the paste into a decanter 15. In the decanter, the bone and fiber parts of the emulsion are separated from the meat, water, salt emulsion, and this latter product may be used, for example, for the production of sausage.

Due to the highly fine crushing, not only of the meat remnants on the bones but also of the bones themselves and fibrous tissues, valuable substances can be extracted from the bones and made available for the nutrition of man. The entire device may operate automatically, beginning with the automatic supply of meat bones to the coarse crusher 2, as well as the supply of ingredients such as ice, water, salt, spices, etc. The emulsion delivered through the pipe 16, which includes meat, water, salt and nutritive components of bone, may be connected directly to a sausage machine or to a mixer, not shown, in which additional cut pieces of meat may be added, for example, if desired.

While a specific embodiment of the invention has been shown and described in detail to illustrate the application of the principles of the invention, it will be understood that the invention may be embodied otherwise without departing from such principles.

What is claimed is:

1. A method of treating large and small bone meats and meat pieces, comprising subjecting the large and small bone meats to a coarse crushing in which the bones and meats are formed into smaller sizes of from 5 to 10 mm, subjecting the smaller sized bones, meat and meat pieces to a preliminary fine crushing to reduce the size further to from 0.5 to 1 mm, supplying ice and salt to the smaller-sized bones and meat and meat pieces which are subjected to a preliminary fine crushing, thereafter, subjecting the reduced size meats to a final fine crushing to form it into a paste, and delivering the paste to a decanter for separating the bone and fiber parts from the meat parts.

* * * * *